United States Patent [19]
Dowling et al.

[11] 3,772,745
[45] Nov. 20, 1973

[54] U-BOLT CLAMP ASSEMBLY

[75] Inventors: William E. Dowling; William R. Heckethorn, both of Dyersburg, Tenn.

[73] Assignee: Heckethorn Manufacturing Co., Dyersburg, Tenn.

[22] Filed: Aug. 31, 1972

[21] Appl. No.: 285,223

[52] U.S. Cl. ............................................. 24/277
[51] Int. Cl. .......................................... B65d 63/00
[58] Field of Search ...................... 24/277; 285/199; 248/72

[56] References Cited
UNITED STATES PATENTS

| | | | |
|---|---|---|---|
| 2,693,975 | 11/1954 | Smith | 285/199 X |
| 3,137,053 | 6/1964 | Osborn et al. | 24/277 |
| 3,284,866 | 11/1966 | Zimmerman | 24/277 |
| 3,605,214 | 9/1971 | Spotts et al. | 24/277 |
| 3,604,676 | 9/1971 | Weber | 248/72 X |

*Primary Examiner*—Donald A. Griffin
*Attorney*—Robert I. Dennison et al.

[57] ABSTRACT

A saddle for a U-bolt clamp is formed from a sheet metal blank rolled at its ends in opposite directions to provide tubular portions which receive the bolt legs in axially slidable relation. Under the clockwise torque transmitted to the ends of the tubular portions as the securing nuts are drawn up on the bolt legs against the saddle, the force exerted on both leg-encompassing tubular portions of the saddle will act to wind or constrict both tighter on the bolt legs or at least will prevent them from twisting loose on the legs. The web of the saddle is reinforced by an integral portion extending between the bolt legs.

6 Claims, 6 Drawing Figures

PATENTED NOV 20 1973 3,772,745

U-BOLT CLAMP ASSEMBLY

BACKGROUND

The field of the present invention is the art of clamps for holding sections of tubing in telescoped connection, generally referred to as U-bolt clamps, or saddle clamps. Such devices are commonly employed in exhaust systems of vehicles.

The prior art directly concerned with such clamps is for the most part derived from a basic assembly comprising a saddle member formed of sheet metal with spaced tubular portions connected in parallel relation by a web integral therewith and having a semicircular edge curved on the radius of the bight of a U-bolt with parallel legs axially slidable in the tubular portions. The free ends of the legs are threaded for reception of nuts that are tightened up against the tubular portions of the saddle member through lock washers to clamp together a coupling of telescoped tubes, such as exhaust pipes, disposed between the bight of the bolt and the curved edge of the saddle member. In known clamps of this type which most closely approach the present invention, the saddle web and tubular portions are formed from a flat blank of thin sheet steel stamped or cut substantially as illustrated in U.S. Pat. No. 3,137,053. The tubular portions of the saddle web which receive the legs of the U-bolt are rolled so that their axial terminal edges are both closely adjacent the same side face of the web. When the securing nuts are drawn up to clamp the telescoped tubular members between the bight of the U-bolt and the curved edge of the saddle member, the incident torque imposed on both tubular portions will be clockwise, in the same direction. Accordingly, one tubular portion will tend to wind tighter on its supporting bolt leg while the other tubular portion will tend to unwind and become loosened on its leg; the distribution and intensity of the forces acting on the thin saddle web as the nuts are progressively drawn tighter then differ substantially in the vicinity of their respective tubular portions, so much so that buckling or other distortion of the saddle web has been known to occur during tightening of the nuts and is likely to occur as a consequence of the inevitable resolution of forces that follows forcible adjustments in assemblies of metal elements. Furthermore, any unwinding of one of the tubular portions impairs the efficiency of the telescoped tube seal that is effected by the compressive force applied by the upper ends of the tubular portions when the securing nuts are fully drawn up, which manner of sealing is characteristic in clamps of the aforesaid prior art type.

SUMMARY OF THE INVENTION

The U-bolt clamp of the present invention is generally similar to the aforesaid prior art clamp in appearance, function, structure and operation, but differs markedly therefrom in that it has none of its apparent or potential disadvantages. The present clamp as herein disclosed is constructed and arranged so that neither tubular portion of the saddle web can be subjected to unwinding stresses during tightening of the securing nuts, and also in that the saddle web is reinforced against possibility of buckling or other distortion by the high torque forces applied in tightening the nuts.

DETAILED DESCRIPTION

Figure 1:
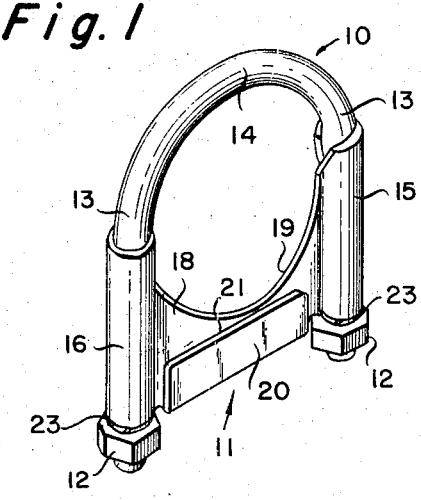
FIG. 1 is a perspective view of a preferred embodiment of the present invention.
Figure 2:
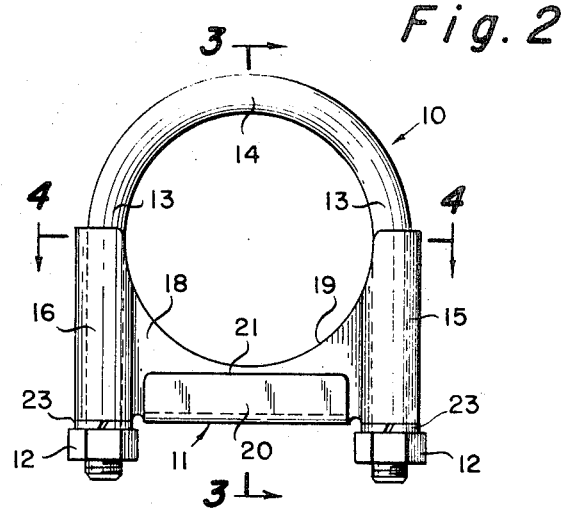
FIG. 2 is a side elevation thereof.
Figure 3:
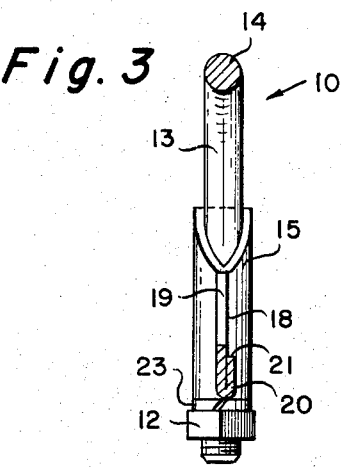
FIG. 3 is a sectional view on line 3—3 of FIG. 2.
Figure 4:
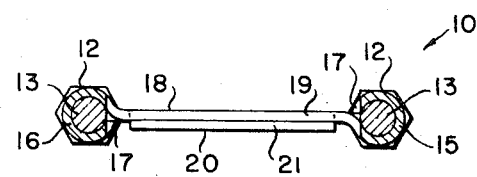
FIG. 4 is a sectional view on line 4—4 of FIG. 2.

The invention herein disclosed is an assembly of six separate parts: a U-bolt 10, a saddle 11, two securing nuts 12, and two lock washers 23. The nuts are threaded on the free ends of the legs 13 which extend in parallel relation from the semicircular bight 14 of the bolt. The saddle is slidable axially on the legs between the securing nuts and lockwashers and the bight of the bolt. In operation, a coupling of telescoped tubular members is compressed between the saddle and the bight when the saddle is moved toward the bight under the propulsion force of the nuts as they are drawn up on the legs.

A salient feature of the present invention is the construction of the saddle 11. This is formed from an initially planar, oblong, sheet steel blank that is rolled at each end to form an integral, full circle loop that is bisected by the plane of the blank. These loops constitute tubular portions 15 and 16 which receive the bolt legs 13 in axially slidable relation when the saddle is mounted on the bolt. As herein shown, the ends of the tubular portions which extend along the bolt legs in the direction of its bight, herein called upper ends, are constituted in a known manner to effect a compression seal on a telescoped tube coupling to which the clamp may be applied. The opposite, lower ends, of the tubular portions are flush in a plane that is normal to the axis of each bolt leg when the saddle is mounted on the bolt.

It will be seen that the end extremity of the blank at each of the tubular portions 15 and 16 provides an axially extending terminal edge 17 that is directed against the proximate side face of the blank but which is not attached thereto. The planar body of the blank between the terminal portions 15 and 16 constitutes a web 18 having a semicircular top edge 19 curved on the radius of the bight 14 and complemental thereto, so that together the bight and the saddle edge 19 deliniate the circumference of a circle equal in diameter to the external diameter of the outer tube of a telescoped tube joint (not shown) clamped between the bolt and saddle.

In the form of the invention illustrated in FIGS. 1-4, the saddle web is doubled upwardly upon itself for a portion of its length to provide longitudinal reinforcement means 20 in the form of a flat strip having a straight upper edge 21 that lies in a plane normal to the axis of each of the tubular portions 15 and 16, and spaced a short distance below the bottom of the semicircular edge 19, preferably about 1/32 of an inch.

Figure 5:
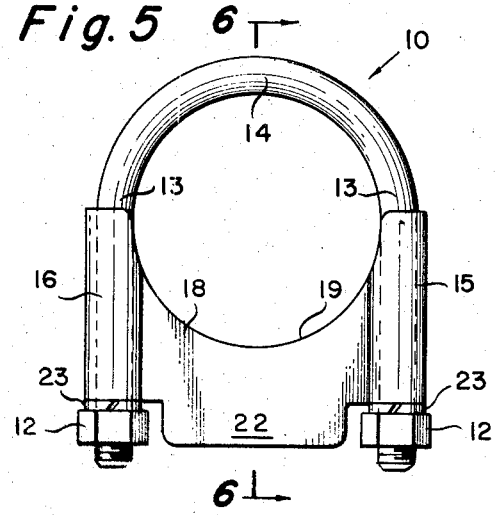
FIG. 5 is a side elevation of a variant of the clamp.
Figure 6:
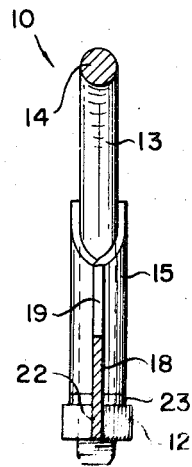
FIG. 6 is a sectional view on line 6—6 of FIG. 5.

In the variant of the invention shown in FIGS. 5 and 6, the only difference from the previous form is in the means for reinforcing the saddle web 18. In this variant, the bottom of the web is extended downwardly in the plane of the web to provide a reinforcing enlargement 22 extending below the plane of the bottom ends of the tubular portions 15 and 16.

Whatever form the saddle 11 may take in possible different embodiments of the invention, the tubular portions 15 and 16 must be so rolled or wound that the clockwise torque transmitted to their flush bottom ends by the securing nuts 12 and lockwashers 23 when they are drawn up against the saddle must always be exerted in such direction that both tubular portions will tend to wind or constrict clockwise on their respective bolt legs, as viewed from the nut end. In order to achieve this, not only must the axial terminal edges 17 of the tubular portions 15 and 16 be at opposite sides of the saddle web 18, but the initial directions in which they are curved must be relatively reversed with respect to a predetermined point of reference. In the present invention, this point of reference is the line of perpendicular intersection between the plane of the web 18 and the plane common to the bottom ends of the tubular portions 15 and 16. From this point of reference the loops constituting both of the tubular portions are trained clockwise, so that the terminal edges 17 of the tubular portions will be at opposite sides of the web. We have discovered that the precise arrangement just described is the only arrangement by which torque exerted on the bottom ends of the bolt leg encasing tubular portions of saddles as the securing bolts are drawn up can be made effective to prevent both tubular portions from tending to loosen on their respective U-bolt legs.

We claim:

1. In a U-bolt clamp assembly having a U-bolt, said U-bolt comprising a bight portion and a pair of legs, a pair of tubular portions axially slidable on said legs, a saddle web integral with and spanning the space between said tubular portions, and securing nuts threaded on the free ends of the bolt legs for drawing up against the adjacent ends of the tubular portions; the tubular portions in cross section being unclosed loops trained clockwise in opposite directions from the saddle web.

2. In the clamp assembly of claim 1, said saddle web being planar, the ends of the tubular portions proximate the securing nuts being in a plane common thereto and which is perpendicular to the plane of the web, each tubular portion being in cross section a circular loop bisected by the plane of the web, one loop being trained initially clockwise from one side of the web, and the other loop being trained initially clockwise from the opposite side of the web.

3. A U-bolt clamp saddle comprising a planar sheet metal blank, a pair of tubular portions thereon in parallel spaced relation thereon and integral therewith, one tubular portion being in cross section a clockwise trained loop open at one side of the blank, and the other tubular portion being a clockwise trained loop in cross section and open at the other side of the blank.

4. A U-bolt clamp saddle comprising a planar, oblong sheet metal member, said member having a relatively thin web portion of uniform thickness forming a work engaging edge portion, and a tubular portion at each end of said member, said tubular portions each adapted to receive a leg portion of a U-shaped bolt to form an opening to receive the work, and reinforcement means formed integral with said oblong member for an appreciable extent at the lower portion thereof and closely adjacent the lower end of said tubular portions receiving the leg portions of the U-shaped bolt, said reinforcing means being distally spaced below the work engaging edge portion, said reinforcement means being an edge portion of the blank doubled back upon itself.

5. In the clamp saddle of claim 4, the blank having a work indenting edge portion spaced above the edge of said doubled back portion, the indenting edge being curved and the doubled back edge being straight.

6. A U-bolt clamp saddle comprising a planar, oblong sheet metal member, said member having a relatively thin web portion of uniform thickness forming a work engaging edge portion, and a tubular portion at each end of said member, said tubular portions each adapted to receive a leg portion of a U-shaped bolt to form an opening to receive the work, and reinforcement means formed integral with said oblong member for an appreciable extent at the lower portion thereby and closely adjacent the lower end of said tubular portions receiving the leg portions of the U-shaped bolt, said reinforcing means being distally spaced below the work engaging edge portion, said reinforcement means being a downwardly extending enlargement of the blank in the plane thereof.

* * * * *